United States Patent
Ji et al.

(10) Patent No.: US 6,380,128 B1
(45) Date of Patent: Apr. 30, 2002

(54) $V_2O_5$-BASED CATALYST FOR REMOVING $NO_X$ FROM FLUE GAS AND PREPARING METHOD THEREFOR

(75) Inventors: Pyung Sam Ji; Hee Mun Eum; Jung Bin Lee; Dong Hwa Kim; In Young Lee, all of Taejeon; In Sik Nam, Pohang; Sung Won Ham, Taejeon; Soo Tae Choo, Pohang, all of (KR)

(73) Assignee: Korea Hydro & Nuclear Power Co., Ltd., Seoul (KR)

( * ) Notice: Subject to any disclaimer, the term of this patent is extended or adjusted under 35 U.S.C. 154(b) by 0 days.

(21) Appl. No.: 09/452,278

(22) Filed: Nov. 30, 1999

(30) Foreign Application Priority Data

Oct. 19, 1999 (KR) .............................. 99-45390

(51) Int. Cl.$^7$ .......................... B01J 21/06; B01J 23/02; B01J 23/22
(52) U.S. Cl. ........................ 502/340; 502/350; 502/353
(58) Field of Search .................. 502/353, 340, 502/350

(56) References Cited

U.S. PATENT DOCUMENTS

| | | | | |
|---|---|---|---|---|
| 2,834,769 A | * | 5/1958 | Feller et al. | |
| 4,113,660 A | * | 9/1978 | Abe et al. | |
| 4,225,462 A | * | 9/1980 | Umemura et al. | |
| 4,298,533 A | * | 11/1981 | Moriya et al. | |
| 4,562,049 A | * | 12/1985 | Shirts et al. | |
| 5,137,855 A | * | 8/1992 | Hegedus et al. | |
| 5,369,076 A | * | 11/1994 | Bouyanov et al. | |
| 5,527,755 A | * | 6/1996 | Wenski et al. | |

FOREIGN PATENT DOCUMENTS

| | | | |
|---|---|---|---|
| DE | 19821056 A1 | * | 8/1999 |
| JP | 53-137894 | * | 12/1978 |
| JP | 58-183946 | | 10/1983 |
| JP | 58-210849 | | 12/1983 |
| JP | 59-35027 | | 2/1984 |
| JP | 62250947 A | * | 10/1987 |

OTHER PUBLICATIONS

M. Sanati et al., "Vanadia Catalysts on Anatase, Rutile, and $TiO_2$(B) for the Ammoxidation of Toulene: An ESR and High-Resolution Electron Microscopy Characterization," *Journal of Catalysis*, vol. 132 (1991), pp. 128–144.

H. Yoshida et al., "Study of deterioration behaviour of catalyst for reduction of $No_x$ with Ammonia," *Proc. 8th Conf. on Catalysis*, Berlin (1984), pp. III–649–III–659.

H. Miyata et al., "Fourier-transform Infrared Investigation of Structures of Vanadium Oxide on Various Supports," *J. Chem. Soc., Fara. Trans. 1*, vol. 1 (1987), pp. 675–685.

T. Shikada et al., "Reduction of Nitric Oxide with Ammonia on Silica-supported Vanadium Oxide Catalysts," *J. Chem. Tech. Biotechnol.*, vol. 33A (1983), pp. 446–454.

* cited by examiner

*Primary Examiner*—Steven P. Griffin
*Assistant Examiner*—Christina Ildebrando
(74) *Attorney, Agent, or Firm*—Martine & Penilla, LLP

(57) ABSTRACT

Disclosed are a catalyst for removing $NO_x$ from flue gas and its preparation. The catalyst comprises vanadium pentoxide, and barium oxide or calcium oxide as active components on a titanium dioxide support and is prepared by uniformly dispersing the metal oxides on the surface of the titanium dioxide support. This support is prepared by sufficiently drying and calcining a metatitanate ($TiO(OH)_2$)-predominating slurry which is obtained from the course of the production of titanium dioxide for pigment from ilmenite. The catalyst exbihits excellent $NO_x$ removal activity as well as high durability against $SO_2$, so that it can remove $NO_x$ for relatively longer period of time without being deteriorated by the poisoning induced by $SO_2$ and significantly contribute to the prevention of plugging and corrosion of the downstream of a SCR reactor system.

8 Claims, No Drawings

$V_2O_5$-BASED CATALYST FOR REMOVING $NO_x$ FROM FLUE GAS AND PREPARING METHOD THEREFOR

BACKGROUND OF THE INVENTION

1. Field of the Invention

The present invention relates, in general, to a catalyst for denitrification and, more particularly, to a catalyst for removing nitrogen oxides (hereinafter referred to as $NO_x$) from flue gas, which is of excellent catalytic activity and of high resistance to $SO_2$ poisoning as well as is economically favorable in its production. Also, the present invention is concerned with a method for preparing such a catalyst.

2. Description of Prior Arts $NO_x$ are generally produced from high-temperature combustion process as a result of the oxidation of nitrogen compounds contained in fuels and/or the reaction of the nitrogen and oxygen excessively fed from the air to the facility. In addition to being a source of photochemical smog, $NO_x$, when exhausted into the air, is known as a main cause of acid rain, along with $SO_2$. Thus, extensive effort has been made to develop technologies for the removal of the pollutant from flue gas.

In order to reduce $NO_x$ emitted from the stationary sources, combustion modification methods, such as low $NO_x$ burners, flue gas-circulating techniques, etc. have been commonly employed. However, combustion modification methods, although $NO_x$ removal efficiency varies with the technologies applied, can not achieve more than 50% of $NO_x$ removal efficiency, in general. As an effective method to reduce $NO_x$ emission, flue gas denitrification has recently attracted the industrial attention.

Flue gas denitrification processes are largely classified into wet methods using absorption solutions and dry methods using adsorption, catalytic decomposition and/or catalytic reduction. Compared with the dry methods, the wet methods are economically and technically unfavorable, since they require large installation and operating costs and can produce secondary waste water which should be treated for discharge. Among the dry methods, the most widely employed technology is the selective catalytic reduction (hereinafter referred to as SCR ), which is the catalytic reduction of $NO_x$ into harmless $N_2$ and $H_2O$ by reductant, $NH_3$. The backbone of SCR technology is a highly active and durable catalyst. Various catalysts, including precious metals, metal oxides, zeolites, etc. have been suggested as being useful for SCR. Among them, vanadium pentoxide-based and zeolite-based catalysts are known to be excellent in its performance.

Vanadium pentoxide-based catalysts show the variety of catalytic activity, depending on the supports which include typically titanium dioxide ($TiO_2$), aluminum oxide ($Al_2O_3$) and silicon dioxide ($SiO_2$). However, titanium dioxide is commonly employed as the support of SCR catalyst due to the catalytic activity for $NO_x$ removal and durability under actual flue gas conditions (T. Shikada, K. Fujimoto, T. Kunugi and H. Tominaga, J. Chem. Tech. Biotech., 33A, 446(1983); H. Yoshida, K. Takahashi, Y. Sekiya, S. Morokawa and S. Kurita, Proc. $8^{th}$ Conf. On Catal., Berlin, III-649(1984)).

These vanadium pentoxide-based catalysts can be prepared by well-known precipitation methods (H. Miyata, K. Fujji, T. Ono and Y. Kubokawa, J. Chem. Soc. Fara. Trans., 83, 675(1987); M. Sanati, L. R. Wallenbweg, A. Andersson, A. Jansen and Y. Tu, J. Catal. 133, 128(1991)) or by mixing the solution containing vanadium precursor with support materials at desired weight ratios and followed by drying and calcining the mixtures as disclosed in Japanese Pat. Nos. 59-35027, 58-210849 and 58-183946.

In addition to the high performance of $NO_x$ removal activity, the vanadium pentoxide-based catalysts should be also highly resistant to the poisoning of the catalyst by $SO_2$. In general, SCR catalyst can be easily poisoned by $SO_2$ which is contained at a level of several hundreds of ppm in flue gas from fossil fuel-burning boilers. Therefore, to remove $NO_x$ from flue gas containing $SO_2$, the catalysts are required to be highly resistant to $SO_2$ poisoning as well as superior $NO_x$ removal activity.

Conventionally, prior to SCP process, a wet flue gas desulfurization(FGD) has been installed to eliminate sulfur oxides and thereby to prevent $NO_x$ removal catalysts from being deactivated in catalytic activity due to the existence of $SO_2$ contained in the flue gas as well as $NO_x$. Although it can protect SCR catalyst from the poisoning by $SO_2$, it can not be a fundamental measure. The operating cost of SCR process can not be ignored due to the temperature difference between FGD and SCR processes, mainly heating cost of flue gas from the temperature of exhaust stream of FGD process to that of the operating temperature of SCR process. Moreover, large investments are also needed to install and operate FGD process.

The catalyst poisoning by $SO_2$ is mainly attributed to the following two reasons. The one is the plugging of catalyst pores by the ammonium salts, which are formed through the reaction of $SO_3$ with the reductant, $NH_3$. The other is the pore blocking and/or the decrease of active sites of the catalyst by the reaction of $SO_3$ with the support and/or the active components of the catalyst. Accordingly, the low conversion of $SO_2$ oxidation to $SO_3$ is required for the durability of a catalyst over $SO_2$. In addition to the catalyst poisoning, $SO_3$ produced by $SO_2$ oxidation, can also react with unreacted ammonia forming ammonium salts which cause the operational problems of the SCR processes such as corrosion and plugging of the downstream of the SCR reactor. Therefore, an useful SCR catalyst should have low catalytic activity for $SO_2$ oxidation to $SO_3$, which largely depends on the chemical composition of the catalyst.

The durability of a catalyst against $SO_2$ also affects the arrangement of the processes for treating flue gas. For the SCR process where the catalyst is readily poisoned by $SO_2$, FGD process should be provided before the SCR process to eliminate $SO_2$ in advance. In this case, the flue gas at high temperature should be cooled to lower temperature (e.g., 50° C. or lower) adequate for effective $SO_2$ removal, and then the gas exhausted from a desulfurizing system should be reheated to a temperature (e.g., 300° C. or higher) at which the reaction for $NO_x$ removal can effectively take place. This is a main disadvantage of the SCR process in terms of energy efficiency. In contrast, SCR catalyst with the high durability against $SO_2$ allows the direct treatment of the flue gas in the process without the previous removal of $SO_2$ by FGD. Therefore, additional energy cannot be consumed to reheat the flue gas. Since the sulfur tolerance of the catalyst has a great influence on not only the life span of the catalyst itself, but also the energy efficiency of the SCR process, it is one of the most important catalytic properties determining the economics of the process.

SUMMARY OF THE INVENTION

According to the present invention, the highly active and durable catalyst for $NO_x$ removal can be prepared by the catalyst preparation methods such as the impregnation and adsorption of vanadium pentoxide on titanium dioxide containing the pore size ranging from 500 to 70,000 Å. The titanium dioxide support could be obtained from a metatitanate ($TiO(OH)_2$)-predominating intermediate in a form of slurry which is produced during the course of the production of titanium dioxide for pigment from ilmenite.

Therefore, the objective of the present invention is to overcome the problems mentioned earlier and to provide a highly active catalyst for removing $NO_x$ from flue gas.

It is another objective of the present invention to provide a catalyst for removing $NO_x$ from flue gas, which maintains an extended life span without losing $NO_x$ removal activity.

It is a further objective of the present invention to provide a catalyst for removing $NO_x$ from flue gas, which can be produced at low cost of the preparation.

It is still a further objective of the present invention to provide a method for preparing such a catalyst.

In accordance with an aspect of the present invention, a $V_2O_5$-based catalyst is provided for removing nitrogen oxides, comprising vanadium pentoxide, and barium oxide or calcium oxide as active components on a titanium dioxide support. The titanium dioxide support can be prepared by sufficiently drying and calcining a metatitanate ($TiO(OH)_2$)-predominating slurry which is obtained from the production process of titanium dioxide for pigment from ilmenite.

In accordance with another aspect of the present invention, a preparation method of a $V_2O_5$-based catalyst is provided for removing nitrogen oxides, which comprises the following steps of: sufficiently drying a metatitanate ($TiO(OH)_2$)-predominating slurry to dehydrate therefrom. The slurry is an intermediate product obtained during the course of the production of titanium dioxide for pigment; calcining the dehydrated slurry at 400~700°C. for at least 5 hours.; and loading vanadium pentoxide, along with barium oxide or calcium oxide, on the titanium dioxide, serving as a catalyst support.

DETAILED DESCRIPTION OF THE INVENTION

A highly active and durable catalyst is obtained by the synergistic action of vanadium pentoxide with barium oxide or calcium oxide on a titanium dioxide support. For the catalyst developed in the present invention, vanadium pentoxide plays a role as a catalytically active ingredient for $NO_x$ removal from flue gas, while barium oxide or calcium oxide serves as an inhibitory component against the catalyst poisoning by $SO_2$. The titanium dioxide support is prepared from a metatitanate ($TiO(OH)_2$)-predominating slurry obtained from the production process of titanium dioxide for pigment. This slurry is dehydrated and calcined to prepare a titanium dioxide support with the pore size, ranged from 500 to 70,000 Å. On the surface of this support is uniformly dispersed vanadium pentoxide, along with barium oxide or calcium oxide, through impregnation or dipping methods. The dipping is better than the impregnation method in terms of the dispersion of active components on the catalyst surface.

To prepare highly active vanadium pentoxide-based catalyst supported on a titanium dioxide for $NO_x$ removal, the hydrogen ion concentration (pH) of the precursor solution for vanadium pentoxide must be carefully controlled during the preparation of the catalyst. An available pH range for the precursor solution is 2 to 6 and preferably 2 to 3.

As the catalyst for $NO_x$ removal using ammonia as a reductant, vanadium pentoxide is preferably loaded on the catalyst surface of $TiO_2$ at the amount of 1~10 weight %, based on the total weight of the catalyst, that is, titanium dioxide, vanadium pentoxide, and barium oxide (BaO) or calcium dioxide (CaO). For instance, when vanadium pentoxide is loaded less than 1.0 weight % on the support, very low $NO_x$ removal efficiency can be obtained. On the other hand, when the loaded amount of vanadium pentoxide exceeds 10 weight %, ammonia, serving as a reductant in this catalytic system, is so actively oxidized that $NO_x$ removal activity significantly decreases at the reaction temperature above 400° C. In addition, the catalyst containing vanadium pentoxide more than 10 weight % promotes $SO_2$ oxidation reaction by which $SO_3$ is produced and causes significant reduction of the catalytic activity. Moreover, the oxidation of $SO_2$ results in producing $SO_3$ which can further react with unreacted ammonia at the downstream of a reactor in combustion equipment. As a result of this reaction, ammonium salts are produced and deposited at the downstream of a reactor, causing the plugging and corrosion of the facility. Accordingly, when flue gas contains $SO_2$, it is not preferable to increase the content of vanadium pentoxide higher than 10 weight % on the catalyst surface.

In order to reduce the catalytic activity for the oxidation of sulfur dioxide to sulfur trioxide, which are exhausted along with $NO_x$, barium oxide or calcium oxide is added to the catalyst containing vanadium pentoxide. This active component is particularly useful to suppress the formation of $SO_3$ from $SO_2$. Its loading amount on the titanium dioxide support is in the order of 1 to 8 weight %, based on the total weight of the catalyst and preferably 3 to 5 weight %. For instance, if less than 1 weight % of barium oxide or calcium oxide is added to the catalyst, the catalyst poisoning by $SO_2$ is not altered. On the other hand, if too much barium oxide or calcium oxide higher than 8 weight % is added, $NO_x$ removal activity significantly decreases due to the low dispersion of vanadium pentoxide on the catalyst surface.

A better understanding of the present invention may be obtained in light of the following examples which are set forth to illustrate, but are not to be construed to limit the present invention.

EXAMPLES I TO VI

Preparation of $V_2O_5$-Based Catalysts at Various Calcination Temperatures

In the course of preparing titanium dioxide for use as pigment by purifying ilmenite, a kind of raw ore, with a sulfuric acid method, an intermediate product as a slurry containing predominatly metatitanate($TiO(OH)_2$), is obtained. This slurry was dried at 120° C. for at least 10 hours and then, calcined at 400~900° C. in the air atmosphere to obtain titanium dioxide as a catalyst support. In order to load vanadium pentoxide on the catalyst surface, serving as a catalytically active ingredient in the present invention, 0.1 N ammonium metavanadate ($NH_4VO_3$) was first dissolved in the ample amount of distilled water, followed by adding oxalic acid to adjust the pH of the aqueous solution to 2.5~3.0. After being heated to 60~70° C., the resulting aqueous solution was mixed with the prepared titanium dioxide for 2 hours, dehydrated in a vacuum evaporator, and sufficiently dried at 100° C. for 12 hours in a drying oven. The dried solid was heated at a heating rate of 5° C. /min to predetermined temperatures at which it was calcined for 5 hours in air atmosphere.

Table 1 shows the $NO_x$ removal activity with the reaction temperatures for the catalysts which contain 2 weight % of vanadium pentoxide on a titanium dioxide calcined at 400~900° C. The reactor space velocity was 100,000/hr, based on the bulk density of the catalyst. The NO and ammonia were each provided at a concentration of 500 ppm and the fed concentration-of oxygen was 5%.

TABLE 1

Properties and Activity of $V_2O_5$ Catalysts Supported on $TiO_2$ Calcined at Different Temperatures.

| | | Reaction Temperature (° C.) | | | | | | | S Content | BET Surface |
|---|---|---|---|---|---|---|---|---|---|---|
| Exmp. | Catalysts | 180 | 200 | 250 | 300 | 350 | 400 | 450 | (%) | Area (m²/g) |
| I | V(2)/TiO$_2$-400 | 37.3 | 53.0 | 95.1 | 99.8 | 100 | 99.5 | — | 2.10 | 121 |
| II | V(2)/TiO$_2$-500 | 34.2 | 57.9 | 94.5 | 99.3 | 100 | 99.3 | 89.2 | 1.81 | 98 |
| III | V(2)/TiO$_2$-600 | 47.8 | 74.6 | 97.7 | 99.6 | 99.8 | 99.6 | 89.2 | 1.46 | 77 |
| IV | V(2)/TiO$_2$-700 | 44.4 | 69.2 | 95.4 | 99.0 | 97.8 | 80.9 | 54.9 | 0.24 | 32 |
| V | V(2)/TiO$_2$-800 | 15.2 | 25.3 | 67.1 | 93.9 | 96.3 | 66.2 | — | 0.03 | 9 |
| VI | V(2)/TiO$_2$-900 | 8.4 | 16.3 | 48.0 | 76.6 | 76.1 | 42.2 | — | 0.00 | — |

As listed in Table 1, the sulfur content of the catalyst decreased with the increase of the calcination temperature. It is mainly attributed to the fact that the sulfuric acid used for the purification of the raw ore remains on the titanium dioxide support and then, is gradually decomposed to come off therefrom as the calcination temperature is raised. In addition, higher calcination temperatures bring about more dense and stable structures of the titanium dioxide, resulting in the decrease of BET surface.

The NO$_x$ removal activity of all the catalysts examined in the present invention was improved as the reaction temperature increases, but the catalytic activity began to decrease at the range of the reaction temperature containing the maximum conversion of NO. This is due to that ammonia oxidation reaction is so prevailing that ammonia is not consumed to reduce NO$_x$ but uselessly spent to form NO$_x$ or N$_2$ at higher reaction temperatures.

Although the loading amount of the active component, vanadium pentoxide is fixed at 2 weight % on the catalyst surface, the catalyst showed the variety of NO$_x$ removal activity depending upon the calcination temperatures of the titanium dioxide. Particularly, the catalysts calcined at the temperatures above 800° C. exhibited less NO$_x$ removal activity, compared to those calcined at the temperatures below 700° C. When the calcination temperature is higher than 800° C., the surface area of the titanium dioxide becomes 9 m²/g or less which is too low for the catalytically active component, vanadium pentoxide to exist in a monolayer on the catalyst surface. Therefore, vanadium pentoxide is poorly dispersed on the support and converted into a different phase which is unfavorable for removing NO$_x$. The limit of loading amount of vanadium pentoxide to be dispersed in a monolayer is known to be approximately 0.145 g per square meter of the surface area of titanium dioxide. Considering that the optimal loading amount of vanadium pentoxide is generally about 2 weight %, the titanium dioxide is preferably calcined at 400~700° C. The vanadium pentoxide is preferable to exist in a monolayer on the catalyst support and its amount depends on the BET surface area of the titanium dioxide.

EXAMPLES VII TO XI

Preparation of Catalysts with Different loading Amount of Vanadium Pentoxide

The catalysts for removing NO$_x$ were prepared by impregnating vanadium pentoxide at amounts of 1~10 weight % on the titanium dioxide calcined at 500° C. Table 2 shows the NO$_x$ removal activity of the catalysts with respect to the reaction temperatures. The loading amount of vanadium pentoxide could be controlled by the concentration of the ammonium metavanadate solution and by the repetition times of the impregnation process. The similar procedure and conditions to the Examples I through VI were also employed to prepare the catalyst.

TABLE 2

NO$_x$ Removal Activity of Catalysts with Respect to the Loading Amounts of $V_2O_5$

| | | Reaction Temperature (° C.) | | | | | | | | | |
|---|---|---|---|---|---|---|---|---|---|---|---|
| Exmp. | Catalysts | 180 | 200 | 250 | 300 | 350 | 400 | 410 | 420 | 450 | 475 |
| VII | V(1)/TiO$_2$ | — | 12.6 | 55.6 | 98.4 | 100 | 100 | — | — | 100 | 100 |
| VIII | V(2)/TiO$_2$ | 34.2 | 57.9 | 94.5 | 99.3 | 100 | 99.3 | — | — | 89.2 | 79.5 |
| IX | V(3)/TiO$_2$ | 35.0 | 68.0 | 99.0 | 100 | 100 | 100 | — | — | 85.6 | 72.3 |
| X | V(6)/TiO$_2$ | — | 88.0 | 99.6 | 100 | 90.0 | 86.8 | — | 51.0 | — | — |
| XI | V(10)/TiO$_2$ | — | 88.0 | 99.4 | 99.8 | 85.6 | 99.0 | 40.2 | — | — | — |

As apparently listed in Table 2, the NO$_x$ removal activity increased as the loading amount of the vanadium pentoxide increased at the reaction temperatures below 250° C. On the contrary, the NO$_x$ removal activity decreased with the increase of the loading amount of vanadium pentoxide at higher reaction temperatures. It is mainly due to the fact that vanadium pentoxide not only plays an important role in removing NO$_x$, but serves to oxidize ammonia at high reaction temperatures.

The catalyst containing the lower loading amount of vanadium pentoxide reveals better NO$_x$ removal activity at higher reaction temperatures. On the other hand, as the loading amounts of vanadium pentoxide increase, the catalyst exhibits higher NO$_x$ removal activity at lower reaction temperatures. Accordingly, it is preferable to control the loading amount of vanadium pentoxide depending on the temperature of the flue gas containing $NO_x$ to be removed.

EXAMPLES XII TO XIV

Preparation $V_2O_5$—$WO_3$ Catalyst and Application to Low Pressure Drop Reactor A low pressure drop reactor such as honeycomb or plate-type is usually employed to remove $NO_x$ from a large scale of flue gas as in power plants. A low pressure drop reactor was prepared by washcoating a honeycomb made of cordierlite with the catalyst prepared in the present invention (Example XII). Two types of low pressure drop reactors, commercially [available plate-type (Example XIII) and honeycomb-type reactors (Example XIV) were examined. The catalyst used in Example XII was prepared by loading vanadium, pentoxide and tungsten trioxide at 2 and 8 weight %, respectively, on a titanium dioxide support calcined at 500° C., and its composition was similar to the commercially available ones. The catalyst preparation was conducted in the same procedure as in Example I~VI. The catalyst thus obtained was well mixed with an aqueous water glass solution and stirred to make a homogenized slurry in which a honeycomb made of cordierlite was then soaked. The honeycomb thus washcoated with the catalyst was dried and calcined. The $NO_x$ removal activity of the washcoated honeycomb reactor was tested for a real flue gas from a power plant. The reactor space velocity was 5,000/hr, based on the total volume of the honeycomb and the ammonia was fed to the reactor a stoichiometric ratios to $NO_x$.

TABLE 3

$NO_x$ Removal Activity of Washcoated Honeycomb Reactor for the Removal of $NO_x$ contained in the Flue Gas from Power Plant

| Exmp. | Catalysts | Reaction Temperature (° C.) | | | | | | |
|---|---|---|---|---|---|---|---|---|
| | | 240 | 270 | 300 | 330 | 340 | 350 | 400 |
| XII | V(2)-W-(8)/$TiO_2$ | — | 730 | 89.0 | 89.0 | — | 90.0 | — |
| XIII | Commercial A | — | 73.1 | 76.9 | 82.0 | — | 87.0 | 80.0 |
| XIV | Commercial B | — | 61.9 | 75.0 | 74.5 | 74.0 | — | — |

As listed in Table 3, the honeycomb reactor washcoated with the catalytic according to the present invention shows higher $No_x$ removal activity than the two commercially available catalytic reactors over the wide range of reaction temperatures covered in the present invention. Accordingly, the catalyst prepared in the present invention can effectively remove $NO_x$ even when it is coated on a honeycomb as a low pressure drop reactor.

EXAMPLES XV TO XVIII

Preparation of $V_2O_5$—(BaO or CaO) Catalyst

In combustion processes, such as boilers, burners, etc, where $SO_2$ is also contained in the flue gas as well as $NO_x$, $SO_3$ produced by the $SO_2$ oxidation reaction seriously deactivates the catalyst. In addition, the ammonium salts formed by the reaction between $SO_3$ and unreacted ammonia can cause plugging and corrosion in the downstream of reactor system. Therefore, the catalysts should exhibit low conversion of $SO_2$ to $SO_3$.

Three kinds of catalyst were prepared by loading 2 weight % of vanadium pentoxide, along with 6 weight % of tungsten trioxide, 2 weight % of barium oxide and 3 weight % of calcium oxide, on titanium dioxide, respectively. The activity of these catalysts for $SO_2$ oxidation was examined to elucidate the catalyst deactivation by $SO_3$. The examples in Table 4 are conducted at a reactor space velocity of 50,000/hr. The concentrations of $SO_2$ and oxygen in feed gas stream were 1,000 ppm and 5%, respectively.

TABLE 4

Conversion of $SO_2$ to $SO_3$

| Nos. of Exmp. | Catalysts | Reaction Temp. (° C.) | | |
|---|---|---|---|---|
| | | 250 | 400 | 450 |
| XV | V(2)/$TiO_2$ | 1.3 | 2.4 | 4.5 |
| XVI | V(2)-W(6)/$TiO_2$ | 2.2 | 3.9 | 5.9 |
| XVII | V(2)-Ba(2)/$TiO_2$ | 1.0 | 1.6 | 2.3 |
| XVIII | V(2)-Ca(3)/$TiO_2$ | 0.8 | 1.2 | 1.5 |

As listed in Table 4, the conversion of $SO_2$ into $SO_3$ was within several percentages, but increased with reaction temperatures for all the catalysts examined in the present invention. Barium oxide or calcium oxide was found to exhibit a strong suppressing role on the $SO_2$ oxidation, while tungsten trioxide rather promoted the $SO_2$ oxidation reaction.

EXAMPLES XIX TO XXI

Effect of BaO on $NO_x$ Removal Activity

Barium oxide, which was identified as an inhibitor suppressing the oxidation of $SO_2$, was examined to determine its influence on the $NO_x$ removal activity. For this, barium oxide was loaded at an amount of 3~5 weight %, along with 2 weight % of vanadium pentoxide, on titanium dioxide support. The $NO_x$ removal activity was tested under the same reaction conditions as in Examples I to VI and the results are listed in Table 5. The catalysts exhibited the variety of $NO_x$ removal activity depending on the amount of loadings of the inhibitors on the catalyst surface. When barium oxide was loaded subsequent to vanadium pentoxide, barium oxide may cover some of the active reaction sites of vanadium pentoxide, resulting in a decrease in the $NO_x$ removal activity. On the other hand, the $NO_x$ removal activity of the catalyst first loading barium oxide prior to vanadium pentoxide on the catalyst surface significantly decreased at the reaction temperature above 350° C., although it did not decrease at low reaction temperature. However, the catalyst prepared by simultaneous loading of barium oxide and vanadium pentoxide using their precursor solution did not show considerable change in $NO_x$ removal activity, compared to the catalyst only loaded with same amount of vanadium pentoxide without barium oxide. Therefore, these two components are preferably deposited at once on the catalyst surface.

TABLE 5

NO$_x$ Removal Activity of Catalysts with BaO

| | | Reaction Temperature (° C.) | | | | | | |
|---|---|---|---|---|---|---|---|---|
| Exmp. | Catalysts | 180 | 200 | 250 | 300 | 350 | 400 | 450 | 475 |
| XIX | V(2)/TiO$_2$ | 34.2 | 57.9 | 94.5 | 99.3 | 100 | 99.3 | 89.2 | 79.5 |
| XX | V(2)-Ba(3)/TiO$_2$ | 37.5 | 60.1 | 96.0 | 100 | 100 | 97.8 | 84.5 | 75.0 |
| XXI | V(2)-Ba(5)/TiO$_2$ | 37.0 | 57.6 | 95.6 | 99.8 | 99.8 | 99.0 | 85.0 | 74.8 |

The catalysts were prepared by soaking the titanium oxide into the solution of precursors of vanadium pentoxide and barium oxide and followed by drying and calcining in the same manner as in Examples I to VI. Consequently, the coexistence of barium oxide with vanadium pentoxide on titanium dioxide allows the preparation of the catalyst which minimizes SO$_2$ oxidation with the maintenance of superior activity of NO$_x$ removal.

EXAMPLES XXII AND XXIII

Deactivation of V$_2$O$_5$—BaO Catalyst with Time for the Reduction of NO$_x$

Since the flue gas from combustion process commonly contains SO$_2$ causing the deactivation of catalyst, the catalyst sulfur tolerance is one of the most important catalytic properties for the application of the present invention to the actual flue gas system.

In the presence of SO$_2$, the change of NO$_x$ removal activity with respect to reaction time was examined for the catalyst containing vanadium pentoxide and barium oxide of 2 and 3 weight %, respectively at 300 and 350° C. The reactor space velocity was 100,000/hr and NO$_x$ and ammonia were provided at identical concentration of 500 ppm. The flue gas also contained sulfur dioxide and oxygen at the concentration of 10,000 ppm and 5%, respectively. The results are given in Table 6.

TABLE 6

Change of NO$_x$ Removal Activity With Reaction Time

| Nos. of | | Rxn. Temp. | Reaction Times (hr) | | | | |
|---|---|---|---|---|---|---|---|
| Exmp. | Catalysts | (° C.) | 0 | 15 | 40 | 70 | 100 |
| XXI | V(2)-BA(3)/TiO$_2$ | 300 | 100 | 100 | 99.8 | 100 | 100 |
| XXII | V(2)-BA(3)/TiO$_2$ | 350 | 100 | 100 | 100 | 99.5 | 99.7 |

Even though 1,000 ppm of SO$_2$ was introduced to the feed gas stream which was much higher than the typical concentrations of SO$_2$ in real flue gas, i.e. hundreds of ppm, NO$_x$ removal activity of the catalysts did not alter at all for up to 100 hours of the operating time at 300~350°C., the practical reaction temperatures at which NO$_x$ removal should be achieved. This reveals that the catalysts according to the present invention exhibit high NO$_x$ removal activity as well as the catalyst durability against the poisoning by sulfur dioxide. Especially. the barium oxide is believed to reduce the oxidative capability of V$_2$O$_5$ on the catalyst surface, suppressing the oxidation of SO$_2$.

As described hereinbefore, a metatitanate (TiO(OH)$_2$)-predominating slurry, an intermediate obtained during the course of the production of titanium dioxide for pigment from ilmenite, is dried and calcined to produce a titanium dioxide support for NO$_x$ removal catalyst, which has an advantage over conventional highly expensive titanium dioxide support in terms of economic point of view. In addition, the physical property of the catalyst such as BET surface area of the titanium dioxide according to the present invention can be modified by controlling the calcination temperature. It allows to prepare the catalysts containing the variety of the catalyst loading amount of vanadium pentoxide, a catalytically active component of the SCR catalyst. It may provide a guideline for the design of the catalyst depending upon the reaction conditions including temperature and SO$_2$ concentration. In addition, the catalysts which comprise vanadium pentoxide, and barium oxide or calcium oxide, in accordance with the present invention, exhibit excellent NO$_x$ removal activity as well as high durability against SO$_2$, so that they can remove NO$_x$ for longer period of time without being deteriorated by the poisoning induced by SO$_2$ and significantly contribute to the prevention of plugging and corrosion of the downstream of a SCR reactor system.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A V$_2$O$_5$-based catalyst for removing nitrogen oxides, comprising vanadium pentoxide and one of barium oxide and calcium oxide as active components loaded on a titanium dioxide support, said titanium dioxide support being prepared by sufficiently drying and calcining a metatitanate (TiO(OH)$_2$)-predominating slurry obtained from production of titanium dioxide for pigment from ilmenite, and said vanadium pentoxide being loaded at an amount of about 1.0 weight % to about 10 weight % based on a total weight of the catalyst provided that the amount of vanadium pentoxide loaded on said titanium dioxide support does not exceed approximately 0.145 gram per square meter of a specific surface area of said titanium dioxide support.

2. A V$_2$O$_5$-based catalyst as set forth in claim 1, wherein said calcination is carried out at about 400° C. to about 700° C. for at least 5 hours.

3. A V$_2$O$_5$-based catalyst as set forth in claim 2, wherein one of barium oxide and calcium oxide is loaded at the amount of about 1 weight % to about 8 weight % based on the total weight of the catalyst.

4. A V$_2$O$_5$-based catalyst as set forth in claim 1, wherein said titanium dioxide contains a pore size ranging from 500 to 70,000 Å.

5. A V$_2$O$_5$-based catalyst as set forth in claim 4, wherein one of barium oxide and calcium oxide is loaded at the amount of about 1 weight % to about 8 weight % based on the total weight of the catalyst.

6. A $V_2O_5$-based catalyst as set forth in claim 1, wherein one of barium oxide and calcium oxide is loaded at the amount of about 1 weight % to about 8 weight % based on the total weight of the catalyst.

7. A method of preparing a $V_2O_5$-based catalyst for removing nitrogen oxides, comprising the steps of:

sufficiently drying a metatitanate ($TiO(OH)_2$)-predominating slurry to obtain a dehydrated slurry, said metatitanate ($TiO(OH)_2$)-predominating slurry being an intermediate product obtained from production of titanium dioxide for pigment from ilmenite;

calcining the dehydrated slurry at about 400° C. to about 700° C. for at least 5 hours to prepare titanium dioxide; and loading a catalyst having vanadium pentoxide and one of barium oxide and calcium oxide as active components on said titanium dioxide serving as a support, said vanadium pentoxide being loaded at an amount of about 1.0 weight % to about 10 weight % based on a total weight of the catalyst provided that the amount of vanadium pentoxide loaded on said titanium dioxide does not exceed approximately 0.145 gram per square meter of a specific surface area of said titanium dioxide.

8. A method as set forth in claim 7, wherein vanadium pentoxide and one of barium oxide and calcium oxide are loaded on said titanium dioxide simultaneously.

* * * * *